Figure 11:
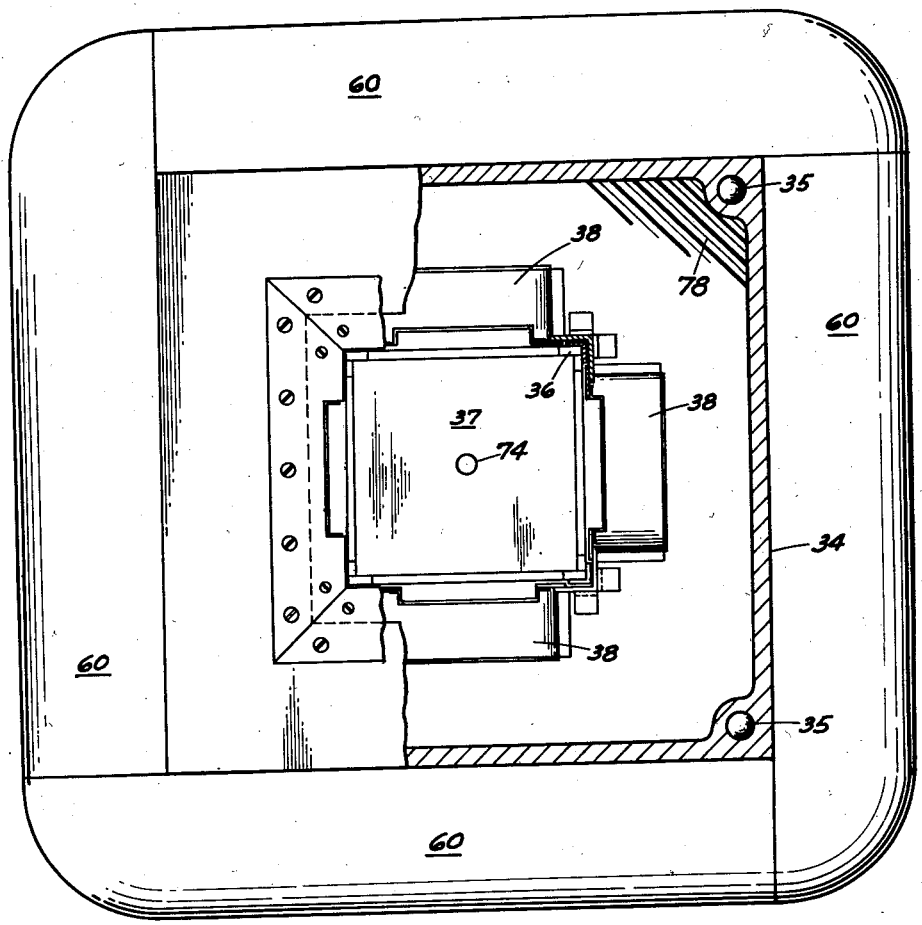

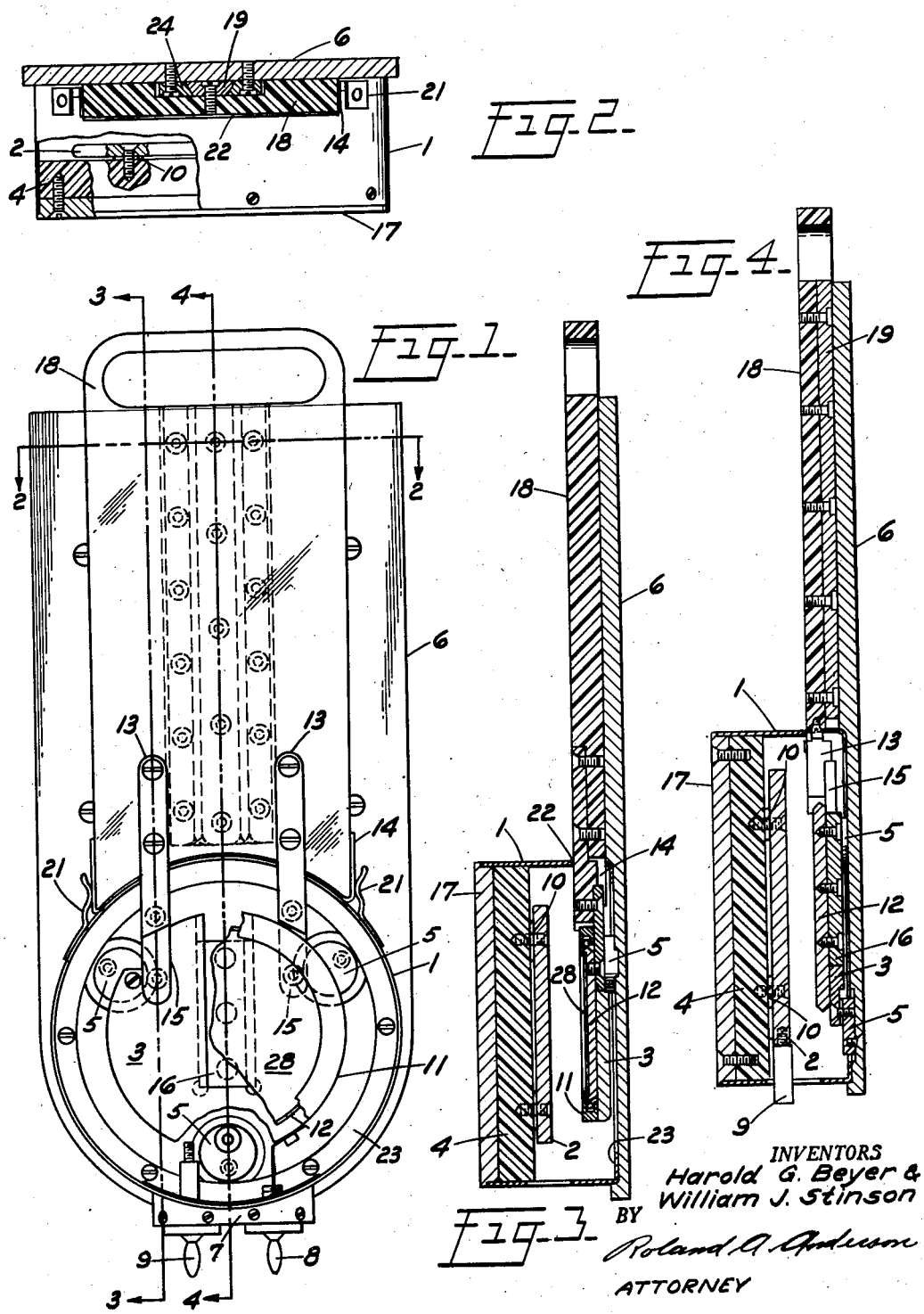

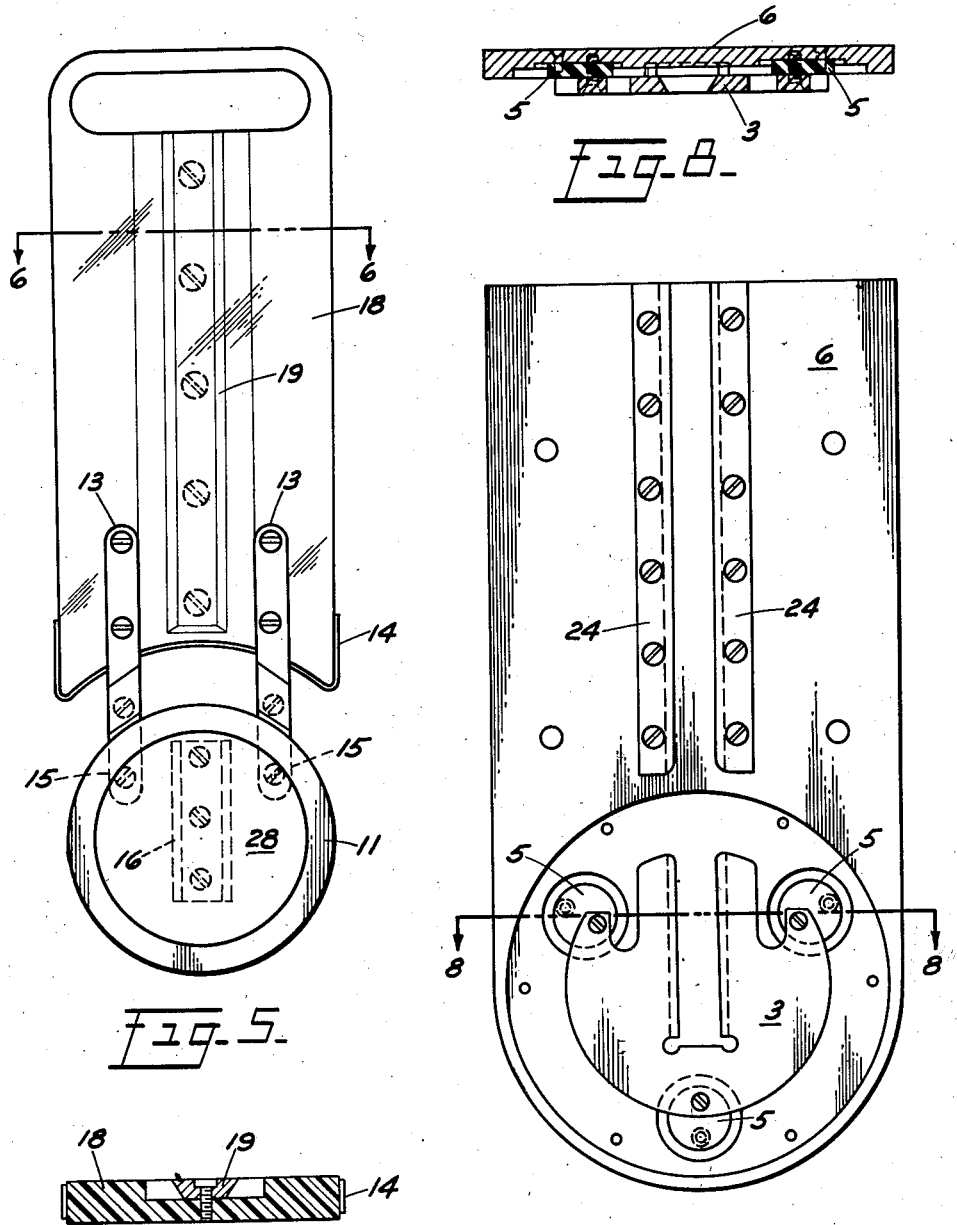

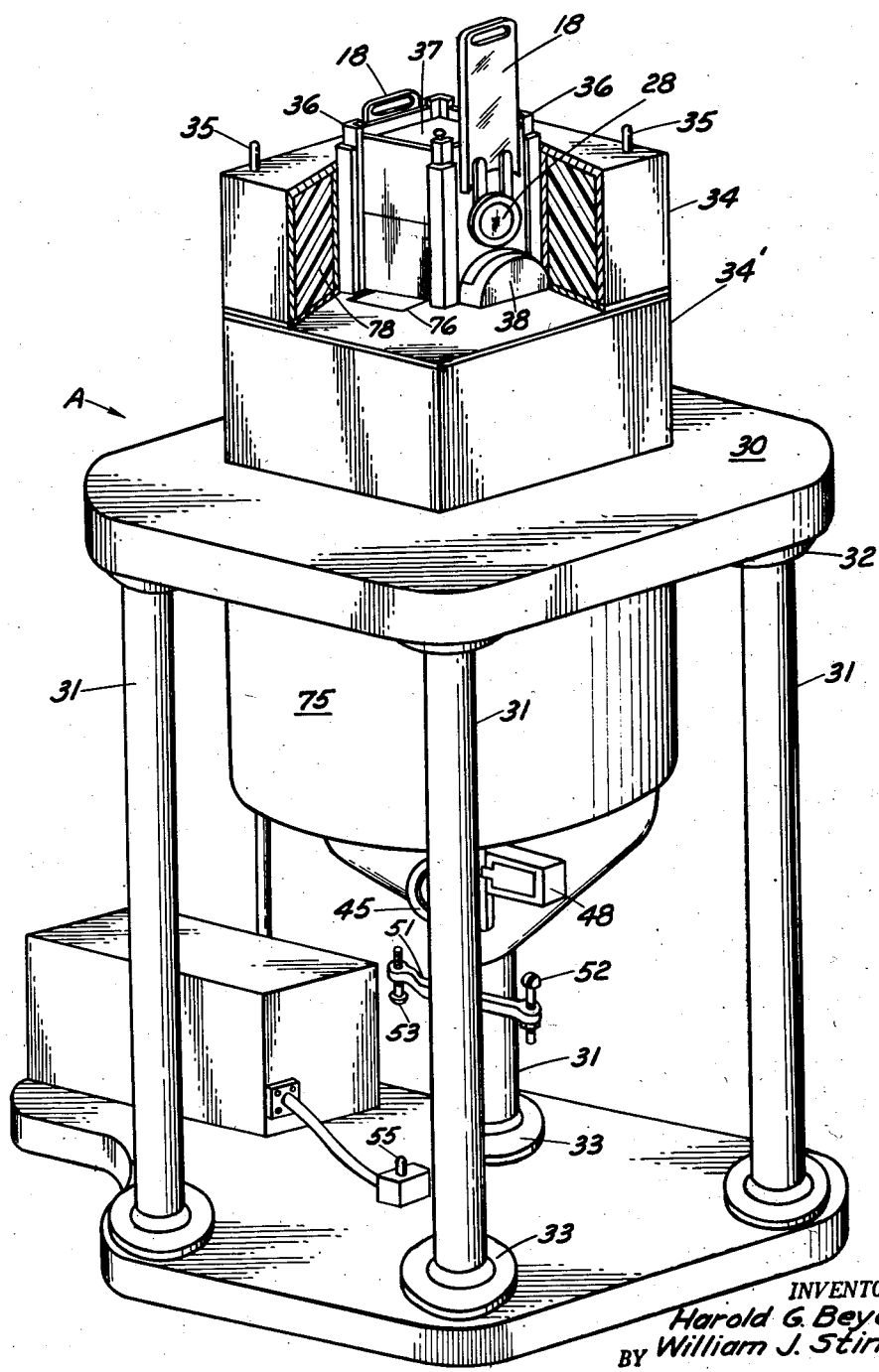

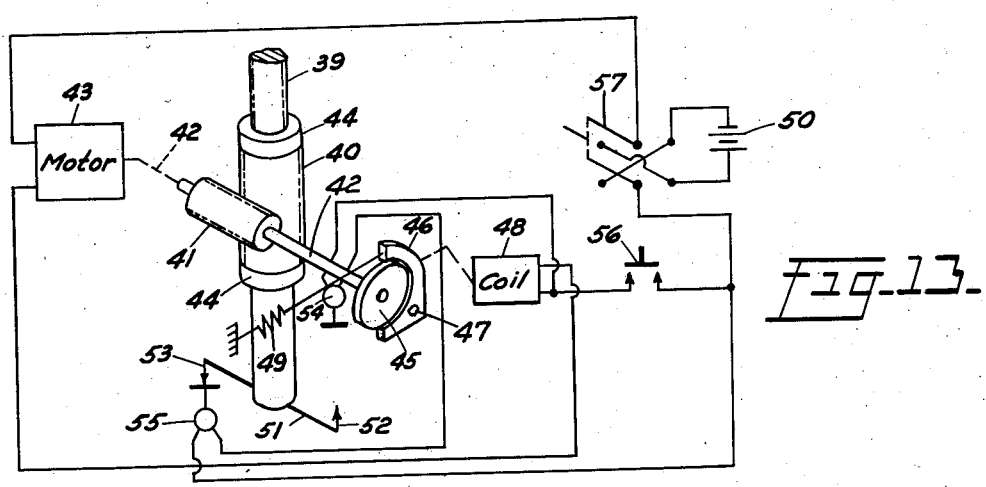
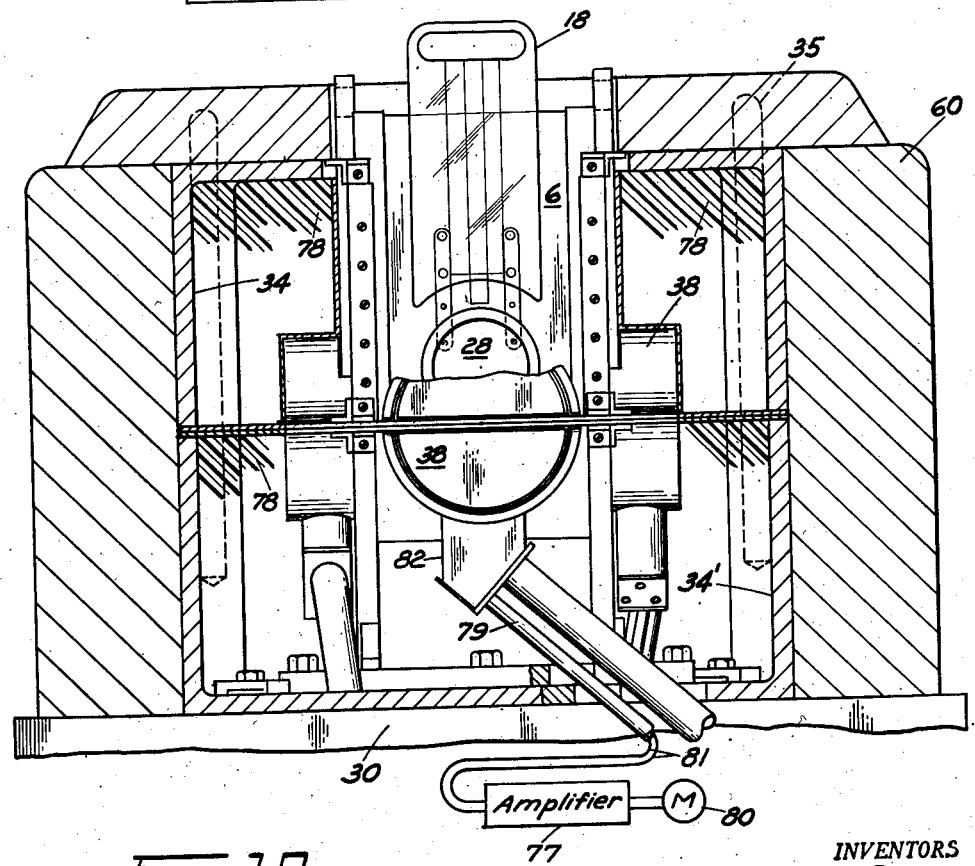

April 23, 1957  H. G. BEYER ET AL  2,790,086
RADIATION DETECTING AND MEASURING SYSTEM
Filed July 13, 1951  7 Sheets-Sheet 5

INVENTORS
Harold G. Beyer &
BY William J. Stinson

ATTORNEY

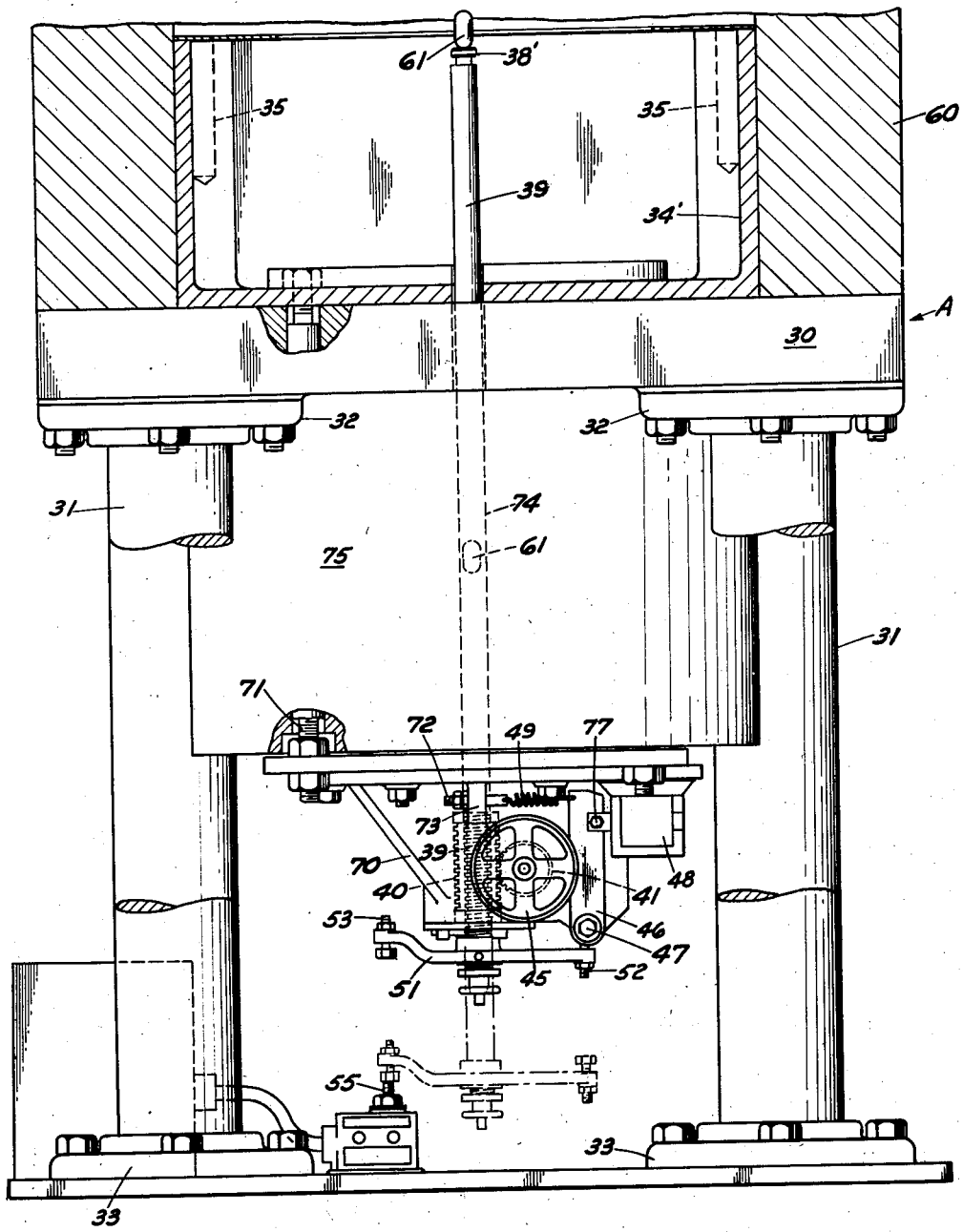

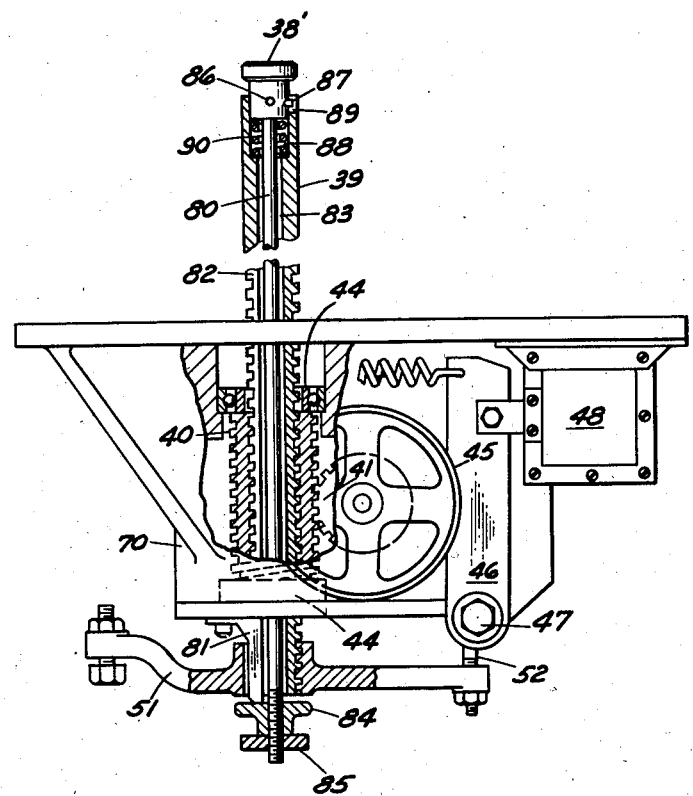
Fig-14-

United States Patent Office 2,790,086
Patented Apr. 23, 1957

2,790,086

RADIATION DETECTING AND MEASURING SYSTEM

Harold G. Beyer, Forest Hills, and William J. Stinson, Skaneateles Falls, N. Y., assignors to the United States of America as represented by the United States Atomic Energy Commission Application July 13, 1951, Serial No. 236,632

10 Claims. (Cl. 250—83.6)

Our invention relates to radiation detecting and measuring systems, and more particularly to an apparatus for routine isotopic analysis of fissionable material in the solid phase, and has great usefulness in measuring the uranium 235 content of samples.

In enriching normal uranium with respect to its isotope of atomic weight 235, it is desirable to determine, as a control on the refining process, the exact degree of enrichment at various steps in the process, including the initial step and at the point of disposal of waste materials. This requires isotopic analysis.

Uranium comprises three isotopes having atomic weights 234, 235, and 238, respectively. Since in normal uranium material, uranium 234 is present only as one part in 17,000, its contribution is considered negligible for the purposes of the present invention.

It has generally been the practice to examine the samples under analysis in a mass spectrometer, but this requires the conversion of the sample to the gaseous phase, and since the spectrometer has only a limited range, it may require a large number of spectrometers to accurately cover the entire range of sample mixtures. In addition, the spectrometer is subject to inaccuracies arising from what may be referred to as spectrometer "memory." Gases fed to the spectrometer for analysis hydrolyze and settle on the walls of the source and other parts, leaving active materials thereon to produce "memory" effects which may result in inaccuracies up to 6%. This and failures from other causes may necessitate considerable maintenance and frequent dismantling of the spectrometer.

On the other hand, the fission of uranium 235 by slow neutrons which do not cause fission of uranium 238 provides a method by which the proportions of these two, over a wide range of sample mixtures, may be determined. The procedure of this method requires a flux of neutrons which is of constant distribution and intensity and a method of placing a definite weight of uranium in the flux in a carefully defined position inside of an ionization chamber in the neutron field. The procedure depends on counting the actual number of fissions produced in the sample by the neutron flux.

The fission of an atom of uranium 235 by a thermal neutron produces fission fragments which cause ionization as they pass through a gaseous medium. The ions when collected in an appropriate chamber form electrical pulses which are amplified, selected by a pulse height discriminator, and after being scaled by a known factor, are recorded on an electromagnetic or other appropriate register.

Although a hydrogenous material might be employed, it has been discovered that when the radium-beryllium mixture or other source, preferably powdered, is positioned in and surrounded by a beryllium block instead of the hydrogenous material, it provides a very excellent source of thermal neutrons, producing up to 2.3 times as many as when the hydrogenous material is employed. Alpha particles from the radium are absorbed by the beryllium, giving off neutrons, while the block of beryllium acts as a photo-neutron source and also as a multiplier, accepting neutrons and emitting or giving off more of them. The multiplication produced by the beryllium block results in a reduction of the energy of the fast neutrons, with the neutrons leaving the block being slower or having lower energy than the bombarding neutrons, or those entering the block. However, some of the high energy neutrons are able to penetrate and get through the beryllium block, and their contribution must be taken into consideration in the analysis of samples by providing cadmium and brass or copper ionization chambers. The cadmium chambers absorb practically all neutrons whose energies are less than 0.4 of an m. e. v., that is, thermal neutrons which will not split uranium 238. Hence, by making two measurements, one in a copper chamber which absorbs practically no neutrons, and the other in a cadmium chamber which absorbs only slow neutrons, the effect of uranium 235 may be obtained by subtraction.

Applicants with a knowledge of the problems of the prior art have for an object of their invention the provision of a radiation detecting and measuring system which will operate in the analysis of a wide range of radioactive materials or mixtures.

Applicants have as another object of their invention the provision of a fission counter which may be employed to examine a variety of mixtures of radioactive materials in the solid phase.

Applicants have as a further object of their invention the provision of a system for analyzing samples of radioactive materials with a high degree of accuracy and which is inexpensive to operate, consistently reliable, and requires a minimum of maintenance.

Applicants have as a still further object of their invention the provision of a fission counter for measuring the isotopic enrichment of the substances including uranium, which will operate upon samples from either the feed or waste and analyze them with a minimum of preparatory treatment or transformation.

Applicants have as a still further object of their invention the provision of a fission counter having an improved source for supplying increased numbers of slow neutrons for activation of samples of materials under examination.

Other objects and advantages of our invention will appear from the following specification and accompanying drawings and the novel features thereof will be particularly pointed out in the annexed claims.

In the drawings, Fig. 1 is a fragmental elevation of our improved sample holder, mounting, and ion chamber. Fig. 2 is a cross sectional view of the arrangement of Fig. 1 taken along the line 2—2 of Fig. 1. Fig. 3 is a longitudinal sectional view taken along the line 3—3 of Fig. 1. Fig. 4 is a longitudinal section of the same arrangement taken along the line 4—4 of Fig. 1. Fig. 5 is an elevation of the sample holder and handle. Fig. 6 is a cross-section taken along the line 6—6 of Fig. 5. Fig. 7 is a front elevation of the ion chamber, with upper electrode and cover removed, mounted on a base which carries a guiding track. Fig. 8 is a cross sectional view taken along the line 8—8 of Fig. 7. Fig. 9 is a perspective, partly in section, of our improved radiation detecting and measuring device showing generally its structure, but omitting one of the sample holders, ionization chambers and associated elements. Fig. 10 is a detail, partly in section, of the mounting for the sample positioning and measuring equipment of our improved radiation detecting and measuring device. Fig. 11 is a plan view, partly in section, of the same device with the sample holder removed therefrom. Fig. 12 is a fragmental sectional elevation of our improved radiation detecting and measuring device. Fig. 13 is a schematic of our improved arrangement for actuating the push rod to elevate and lower the radiation source. Fig. 14 is an elevational sectional detail of the positioning mechanism for the capsule.

Uranium hexafluoride samples, received in valved nickel tubes, may be distilled under vacuum to a cooled platinum trap, hydrolyzed to uranyl fluoride, transferred to tared platinum crucibles, evaporated to dryness, and ignited to urano-uranic oxide. Other types of samples may be received directly as the oxide. For isotopic assay, oxide weights are preferably adjusted to fixed quantities of about 50 to 400 milligrams, dissolved in nitric acid, and diluted to standard volume. Other samples which may be received as pure uranium nitrate solution of known uranium concentration are used without change or diluted if necessary.

Films of urano-uranic oxide of 8 milligrams mass are electroplated from hot ammonium oxalate solution onto one side of 63 mm. by 0.7 mm. electropolished nickel disks, using a current of about 3 amperes at from 5 to 15 volts, the solution being stirred by a rotating platinum or other appropriate anode. The disks are then dried and ignited at about 400° C. The uranium oxide films thus prepared are tough and adherent.

The disks are placed in the holders and exposed for predetermined lengths of time to an unvarying thermal neutron flux from several grams of radium beryllium powder enclosed in a beryllium block and surrounded by petrolatum. Ions or electrons from the ion tracks produced in air, or some ionizing medium having a low coefficient of attachment such as nitrogen, by the fission production of uranium 235, are collected by a high voltage plate. The pulses are equalized, amplified, and counted by equipment which has a linear response up to about 20,000 randum pulses per minute. However, later counting equipments had a response rate of up to 60,000 randum pulses per minute. The uranium 235 assay can then be computed from the counting rate.

Referring to the drawings in detail, A generally designates a table having a flat thick top 30 which serves both as a support for our improved radiation detecting and measuring device, and as a bottom gamma radiation shield. This top is preferably made of lead or lead alloy, type metal being preferred for mechanical reasons. The top 30 is supported by a series of tubular legs 31, 31 of any suitable material joined through appropriate couplings 32, 33 to the table top and the supporting surface, respectively. The couplings may be screw threadedly attached to the ends of the legs 31, and may take the form of the conventional coupling customarily used for mounting tubular supports or other elements on walls. A cast brass box 34, or other structure of suitable material, made in two sections, is mounted on table top 30, the bottom section 34' of box 34 having four upstanding pins 35 adjacent to and socketed in its corners, which register with corresponding sockets near the corners of the top or upper section of the box 34. These sockets in the upper section of the box are adapted to receive pins 35 for interlocking the two sections of the box together. An aluminum inclosure or frame 36 forming an open ended prism with square base and comprised of a series of uprights bridged by plates is mounted centrally of the brass box 34, and extends from the base of the lower section 34' of the box to a point above the upper section thereof. A beryllium block 37, which may be of two parts, is disposed within and retained at its position by the frame 36. Externally of the frame 36 and located along the sides of the frame are four demountable or removable ionization or counting chambers 38. The chambers are positioned so that they are opposite the centers of the sides of the box 34' and of the beryllium block 37, although any other spacing may be employed.

In this embodiment the ionizing chambers 38 are cylindrical but need not necessarily be so. To facilitate the mounting of the chambers 38, four semi-cylindrical sockets are formed in the top section of box 34 which register with similar sockets in the lower section 34' of the box to receive the cylindrical ionization chambers 38 which preferably carry extension 7 (Fig. 1) having prongs 8, 9 for seating in conventional electrical receptacles in conduit terminals 82 to provide electrical continuity and furnish mountings for the ionization chambers.

While any suitable conventional ionization chamber may be utilized in the system, one form which was originally used is shown in Figures 1 through 8 wherein 6 designates an elongated base of aluminum or other material. The base 6, for each chamber may also be secured to the frame 36 by screws or other means. Mounted on the base 6 adjacent one end is a casing 1 having a lower annular flange 23 for seating on the base 6. Screws or other appropriate means pass through the flange and seat in the base 6 for retaining the casing or shell 1 in place. Seated in polystyrene washers, held in place in the shell or casing by set screws which pass through an extension 7 of the casing and into the washers are contacts 8, 9 connected to the lower and upper electrodes, respectively, of the ionization chamber. Contact 8 is preferably joined to lower electrode 3 through a lead, while contact 9 has an extension preferably threaded which screws into a socket in the upper electrode 2. Positioned on the base 6 and secured thereto through spaced insulators 5 and screws is the bottom or high voltage electrode 3 having an open ended slot formed in its central portion and cut away walls to define a pair of extensions. Positioned above the high voltage electrode 3 and in spaced relation thereto and supported by an insulator arrangement is the top electrode 2. The top electrode 2 is secured through screws and spacers 10 to the wax block 4 which is molded on or otherwise secured, such as by screws, to the cover 17 of the casing 1. In one form, such as Fig. 4, screws pass through the cover 17 and into the wax block 4 for joining them together.

Positioned on the elongated base 6 next adjacent to the ionization chamber by a series of screws is a track made up of spaced strips 24, 24 having opposed bent or undercut edges for the reception of a dovetailed strip 19 on insulated handle 18, to permit interlocking sliding engagement therewith. Strip 19 is positioned centrally of a longitudinal recess in the under side of handle 18 which is also adapted to receive the two track elements or spaced strips 24, 24. The forward edge of the handle 18 has a metallic rim 14 attached to the edge of the handle by screws or other suitable means. Secured to the handle 18 and projecting forwardly therefrom are a pair of legs 13, 13 with metallic extensions 15, 15 joined thereto through screws or other appropriate means. These extensions are secured to the underside of a sample holder 12 preferably by screws. In order to facilitate the positioning of the sample between the electrodes 2 and 3 a slot 22 is formed in the wall of the casing or shell 1 for the passage of the holder and handle 18. Resilient fingers 21 are mounted by screws or otherwise on and extended outwardly from the walls of the casing 1 adjacent the extremities of the slot and serve to frictionally engage the rim 14 on handle 18 to assure continuity of shielding.

The ionization chamber is closed by a cover 17 which has a reduced portion that telescopes within the casing 1 and carries a series of screws which thread into the cover and pass through spaced openings in the casing for interlocking the cover 17 with the casing 1. The wax disk 4 secured to the inner face of the cover acts as a slow neutron reflector and tends to increase the neutron flux in the chamber.

In the above arrangment the collection of ions in air is employed in the conventional way as a method of detecting fissions of uranium 235. In this arrangement the sample in holder 12 is subjected to the action of slow neutrons from the source described hereinafter. The uranium 235 isotope of the sample is fissioned by the neutrons, and the fission fragments moving through the sensitive volume or space within the chamber serve to ionize the gases therein. The ions thus formed are collected on the collector plate and serve as a measure of the fissions. However, the "dead time" is a limiting factor on the use of the equipment, and is greater for the collection of ions than would be the case if the much faster electrons were collected. Thus for use in the analysis of samples of uranium having increased uranium 235 enrichment, an improved ionization chamber was needed for best results. This preferred form of chamber is disclosed in the copending application of Lykins et al., Serial No. 187,638, filed September 29, 1950, and was developed to reduce the dead time. Hence, the collection of electrons produced during ionization, instead of the slow ions, was necessary to achieve the desired rapid collection time. A basic factor which determines whether the negative ions or electrons may be collected is the electron coefficient of attachment of the ionizing medium. This coefficient is "the number of collisions which an electron must make with neutral molecules or atoms, before it sticks and forms a negative ion." Therefore, to collect electrons, an ionizing medium having a large electron coefficient of attachment is essential. Nitrogen among other gases, is suited for this purpose. So, instead of using air, as was generally the practice, nitrogen gas was led into the chamber. Spaced electrodes of different size within the chamber were maintained at a difference of potential of about 2,000 volts. The spacing between these electrodes may be reduced. These features tend to reduce the capacitance between the collecting electrode and grounded chamber, and also effect the amplitudes of the alpha pulses. Each in maintenance and reproducible geometry in the chamber was attained through the use of an inverted U polystyrene yolk which was employed to mount and support the signal collector electrode.

The sample holder 12 may be of any appropriate type, but preferably takes the general form of that disclosed in the copending application of Stinson, Serial No. 164,010, filed May 24, 1950. The samples 28 are contained on flat disks which may be mounted in a snap ring holder, preferably of the type of Stinson, supra. However, these samples are readily removed from their holders and replaced. Generally, the sample backing plate is of aluminum when the copper chamber is in use, while cadmium backing plates are usually used in conjunction with cadmium chambers.

The remainder of the support frame 36 not occupied by the beryllium block 37 is filled with petrolatum or other suitable material which serves as a neutron reflector and moderator. Both sections of the brass box 34 are also packed with petrolatum 78 for reflecting and moderating the fast neutrons emitted from the radium-beryllium source and the beryllium block. A thin copper wall separates the petrolatum in the upper section of brass box 34 from support frame 36, and conforms to the contours of the chambers 38. Recesses 76 are formed in the lower section of box 34 for the reception of the ionization chambers, which are surrounded by the petrolatum. Type metal slabs, 60, 60 indicated in Figs. 11 and 12 of the drawings, are stacked around brass box 34 for the purpose of absorbing gamma radiation emitted from the radium-beryllium source when it is in position in the beryllium block 37.

The radium-beryllium source is preferably contained in a small nickel capsule 61 and is elevated into or lowered from such position by a push rod 80 which terminates in or is joined at its upper end to a plug 38' and is movably housed in an appropriate bore in and supported by shaft 39 which passes vertically through the center of the device including the table 30. As indicated more clearly in Figures 12 and 13 the shaft or rod 39 has a threaded outer surface which is adapted to co-act with the threads of the internally screw threaded tubular gear 40, the outer face of which carries teeth which mesh with a conventional worm gear 41, keyed to and carried by the shaft 42 of an A. C. or D. C. motor 43. For supporting it in position gear 40 is swivelly mounted in conventional bearings 44, 44 carried by the frame or carriage 70 and suspended by threaded rods 71 from the under surface of the table top 30. The shaft 42 projects on beyond the worm gear 41 and mounts a disk or drum pulley 45 which co-acts with a brake shoe 46 pivoted at one end on a pin 47 and actuated out of engagement with the drum 45 at the other end by a solenoid 48 pivotally joined thereto at 77. The shoe 46 is normally maintained in tight frictional engagement with the drum 45 with the usual tension spring 49 which engages and interlocks with the free end of the shoe 46 and urges it towards the drum. The opposite end of the spring is anchored by a bolt 72 which passes through an ear 73 projecting downwardly from frame 70.

As indicated in Fig. 13 the motor 43 and solenoid 48 are connected to a source of power 50. In this diagrammatical showing, it takes the form of a conventional battery 50, but in practice the power for this purpose will be taken from the commercial or other A. C. or D. C. power mains or supplies. While the solenoid 48 and the motor 43 are shown as electrically connected in series, it will be apparent that a parallel connection may be more suited to actual operating conditions. For the purpose of controlling the operation of the motor 43 and solenoid 48 a cross member 51 is fixedly mounted on the lower end of shaft 39 and carries adjustable pins or screws 52, 53 which screw thread into sockets adjacent the extremities of the cross member 51. These pins or screws are adapted to engage and actuate conventional button or microswitches 54, 55 to open the circuits through them. Switches 54, 55 are connected in series with each other and in parallel with a manually operated normally open switch 56 in the power circuit supplying motor 43 and solenoid 48. For the purpose of reversing the motor 43, a double pole double throw switch 57 is provided to reverse the leads to the power source.

Referring to Fig. 14 which shows a detail of the mechanical stop arrangement for the shaft, 81 represents a key which is fixedly mounted on the frame 70 and seats in a longitudinal key way 82 in the shaft 39. The push rod 80 extends down through a longitudinal bore 83 in the shaft 39 terminating in a threaded end which projects on beyond the shaft and carries an adjustable stop nut 84 which serves as an abutment for engagement with the lower end of the key 81. A lock nut 85 is also positioned on the rod 80 and serves to hold the nut 84 in adjusted position. The upper end of push rod 80 seats in a socket in plug 38' and is joined to it through a pin 86. Plug 38' slidably seats in a counter bore 88 in shaft 39 and carries a pin 87 which slidably seats in an open ended slot 89 in the shaft. This arrangement serves as an interlock between plug 38' and shaft 39 which permits longitudinal movement between them. The cross member 51 is shown mounted on the lower extremity of the shaft. A compression spring 90 is interposed between the shaft 39 and plug 38'. As the shaft 39 is moved upwardly as heretofore described, key 81 slides in key way 82 until shaft 39 has reached the upper extremity of its movement at which time the end of the key engages the adjusting nut 84 and stops the upward movement of rod 80, causing spring 90 to be compressed upon further upward movement of shaft 39. After a slight amount of over travel the motor is stopped by engagement of screw 52 with switch 54 and the action of brake 46. This stops the upward travel of shaft 39 and brings the system to rest.

The radium-beryllium source is placed in a container such as a capsule 61 and is inserted through the opening or bore 74 in block 37 by tongs or other appropriate means. It is positioned and rests upon the plug 38' on the upper end of push rod 80, shown in the shielded portion 75 of the device. After inserting the capsule into the opening in the bore 74 a cylindrical plug of lead (not shown) may then be placed in the bore on top of the capsule 61. This plug acts as a shield while the capsule is in lowered position and while the samples are positioned. The plug is preferably loosely fitted into the bore so that it will rest upon and rise and fall with the capsule. Samples to be tested are mounted in holder 12 carried by the handle 18 having a spline 19 engaged in the dove-tailed grooves of strips 24, 24 on base 6. In each arrangement, the slide may be moved down the base 6 by means of the handle 18 until the holder 12 passes through slot 22 and is positioned in the ionizing chamber 38 with the sample interposed between the plates 2 and 3. When all of the samples, not exceeding four which are to be tested, have been properly positioned, by their respective holders and with the push rod 38' at the lower extremity of its travel, so that the radium-beryllium source is positioned in the center of the type metal cylinder or shield 75, the manual push button 56 is closed. With the double pole, double throw switch 57 thrown to such a position as to rotate the motor 43 in a direction to raise the push rod 80, the circuit from the power source 50 through the motor 43 and solenoid 48 is completed. As the solenoid 48 is energized, its armature actuates the brake shoe 46 away from the drum 45 and the motor 43 commences to rotate. Worm 41 on the shaft 42 of the motor 43 rotates tubular gear 40 in its swivel and raises shaft 39 and push rod 80. As push rod 80 moves up, screw 53 of cross member 51 is disengaged from switch 55, permitting it to close. This completes the holding circuit around switch 56 so that it may now be without interrupting the operation.

The motor 43 continues its operation until the radium-beryllium source is raised to its proper position within the beryllium block 37. At this point the screw 52 on cross member 51 is brought into engagement with the push button 54. As the button on the switch 54 is depressed by screw 52, the circuit through the motor 43 and solenoid 48 is opened. This deenergizes the solenoid so that spring 49 forces the shoe 46 into tight frictional engagement with the drum 45, bringing the motor 43 to a stop.

With the ionizing chamber 38 having a copper case in place in the device, both high energy and thermal neutrons pass through the case and activate the uranium of the sample 28. The charge collected on the collector plate of the ion chamber, in each instance, is fed through leads 81 passing through conduit 79 to amplifier 77 and measured and/or recorded by meter 80 in the usual manner to indicate the combined action of the fast and slow neutrons on the sample containing both uranium 235 and uranium 238. When these counts thus produced are measured and/or recorded, the switch 57 is reversed and the manual push button 56 is closed, completing the circuit through motor 43 and solenoid 48. This causes the motor to rotate in the opposite direction and to lower the push rod 80, and in turn the radium-beryllium source, to a point within the shield 75, in a manner heretofore described. When the rod 80 has reached the lower extremity of its travel, pin or screw 53 on cross member 51 engages and depresses the button on the switch 55 opening the circuit to motor 43 and solenoid 48 and stopping the rotation of the motor in a manner indicated above.

The upper section of block 34 may then be raised and the copper ionization chambers 38 may be replaced with cadmium chambers. The components may again be assembled and the procedure outlined above may be repeated. Since the cadmium absorbs the thermal or slow neutrons, they do not reach and activate the sample 28. The fast neutrons, however, do reach the sample and serve to activate the uranium 238. The readings thus obtained indicate only the uranium 238 activity, and when subtracted from the readings previously taken on the total activity, the difference indicates only that portion of the activity attributable to uranium 235. However, during routine checking the above procedure may be modified by omitting the step of removing the box 34. The capsule 61 is simply lowered and the holders 12 are inserted and removed by handles 18, with new samples being substituted each time.

Having thus described our invention, we claim:

1. A fission counter of the character described comprising a source of fast and slow neutrons, a series of ion chambers positioned about the source and within the range thereof, a series of sample holders for insertion into and removal from the chambers, samples carried by the holders for positioning between the electrodes of the chambers for activation, and means responsive to the ionization resulting from the activation of said samples for providing a measure thereof.

2. A fission counter of the character described comprising a source of radiations, a shield disposed about said source, means for raising said source out of said shield and returning it to its original position, an ion chamber positioned above said shield and within the range of the ion source when in raised position, means for disposing a sample within the ion chamber adjacent its electrodes for bombardment by said source, and means coupled to said electrodes for indicating the ionization in said chamber.

3. A fission counter of the character described comprising a hollow shield, a source of radiations disposed within the shield, means for raising the source up out of the shield, a series of ion chambers positioned above the shield and disposed about said source when in raised position, means for positioning samples of fissionable material between the electrodes of said chambers within the range of radiations from said source, said radiations serving to fission said samples, and means responsive to ionization in said chambers for providing a measure of the intensity thereof.

4. A fission counter of the character described comprising a tubular shield, a source of fast and slow neutrons disposed within the shield, means for raising and lowering the source out of and back into said shield, a neutron multiplier positioned above the shield for exposure to radiations from the source when it is in raised position, an ion chamber positioned adjacent the neutron multiplier and within range of said neutrons, means for positioning a sample between the electrodes of said chamber to permit neutron bombardment and fission of said sample, and means coupled to said electrodes for measuring ionization resulting from said fission.

5. A fission counter of the character described comprising a tubular shield, a source of fast and slow neutrons positioned within the shield, means for raising and lowering the source for projecting it above said shield, a beryllium element positioned above the shield for exposure to the neutrons of said source to produce neutron multiplication, an ion chamber positioned adjacent said element and within the range of neutrons therefrom, means for inserting a sample between the electrodes of said chamber to permit the material thereof to fission, and means coupled to said electrodes for measuring the ionization resulting from fission.

6. A fission counter of the character described comprising a tubular shield, a source of fast and slow neutrons disposed within said shield, means for raising the source up out of the shield and for lowering it into said shield, a neutron multiplier positioned above the shield and having a cavity for the reception of said source when in raised position, a series of ion chambers positioned about the multiplier and within the range of neutrons therefrom, sample holders for removably positioning samples between the electrodes of said chambers to be fissioned by said neutrons, and means responsive to ionization in said chambers for measuring the fissions of said samples.

7. A fission counter of the character described comprising a tubular shield, a source of fast and slow neutrons disposed in the shield, a beryllium block having a cavity therein for the reception of the source, means for raising the source into the cavity in said block for multiplying the neutrons from said source, a series of ion chambers positioned about the block and within range of the neutrons therefrom, slots in the ion chambers for the reception of sample holders, means for slidingly mounting said holders to permit the insertion of samples between the plates of the ion chambers in a position to be fissioned by the neutrons from said block, and means coupled to the plates of the ion chamber for measuring the fission of said samples in terms of ionization.

8. A fission counter of the character described comprising a tubular shield, a source of fast and slow neutrons disposed within the shield, means for raising the source to a predetermined height above the shield and for returning it to a predetermined position within the shield, said means including a push rod passing upwardly through the shield to support the source and an electrically responsive device for actuating the rod up and down, an ion chamber positioned above the shield and within the range of neutrons, means for positioning a sample to be fissioned between the plates of the chamber, and means coupled to said plates to measure fission in terms of ionization.

9. A fission counter of the character described comprising a shield having a bore therein, a source of fast and slow neutrons disposed within the shield, means for raising the source to a predetermined height and lowering it to a position within the shield, said means including a rod for reciprocatory movement within the bore to raise and lower the sample, an electric motor engageable with the rod for raising and lowering the rod, switches at either extremity of movement of the rod for breaking the circuit to the motor and rendering it inoperative, an ion chamber positioned above the shield within range of neutrons of the source when in raised position, means for positioning a sample to be fissioned between the plates of the ion chamber, and means for measuring the fissions of said sample in terms of ionization.

10. A fission counter of the character described comprising a frame, a shield carried by the frame and having a bore therein, a source of fast and slow neutrons disposed within the shield, means for raising the source to a predetermined position above the shield and for returning it to a point within said shield, said means including a shaft for reciprocatory motion within said bore, a motor for actuating the shaft, and a cross arm for engagement with switches at either extremity of movement thereof to break the circuit to said motor, a beryllium block carried by the frame and positioned above the shield, said block having a cavity for the reception of said source when in raised position to multiply the neutrons from said source, ion chambers disposed about said block and within the range of neutrons therefrom, means for positioning samples between the electrodes of the ion chambers for fissioning by said neutrons, and means coupled to the chambers for measuring the fissions of said samples in terms of ionization.

References Cited in the file of this patent

UNITED STATES PATENTS

| | | |
|---|---|---|
| 2,496,123 | East et al. | Jan. 31, 1950 |
| 2,506,944 | Stauffer et al. | May 9, 1950 |
| 2,551,531 | Freeman | May 1, 1951 |